(12) United States Patent
Taylor et al.

(10) Patent No.: US 11,345,501 B2
(45) Date of Patent: May 31, 2022

(54) PACKAGING MACHINE

(71) Applicant: TNA Australia Pty Limited, Lidcombe (AU)

(72) Inventors: Alfred Alexander Taylor, Lugarno (AU); Deni Ferfolja, Bexley (AU)

(73) Assignee: TNA Australia Pty Limited, Lidcombe (AU)

( * ) Notice: Subject to any disclaimer, the term of this patent is extended or adjusted under 35 U.S.C. 154(b) by 431 days.

(21) Appl. No.: 16/351,944

(22) Filed: Mar. 13, 2019

(65) Prior Publication Data

US 2019/0300217 A1    Oct. 3, 2019

(30) Foreign Application Priority Data

Mar. 13, 2018 (AU) ................................. 2018900828

(51) Int. Cl.
| | | |
|---|---|---|
| *B65B 51/30* | (2006.01) | |
| *B65B 51/16* | (2006.01) | |
| *B29C 65/00* | (2006.01) | |
| *B29L 31/00* | (2006.01) | |

(52) U.S. Cl.
CPC ........ *B65B 51/306* (2013.01); *B29C 66/8145* (2013.01); *B65B 51/16* (2013.01); *B29C 66/849* (2013.01); *B29L 2031/7128* (2013.01)

(58) Field of Classification Search
USPC ......................................................... 53/548
See application file for complete search history.

(56) References Cited

U.S. PATENT DOCUMENTS

| | | | |
|---|---|---|---|
| 4,663,917 A | 5/1987 | Taylor et al. | |
| 5,125,213 A | 6/1992 | Focke et al. | |
| 2003/0136092 A1* | 7/2003 | Taylor ................... | B65B 51/306 53/550 |
| 2010/0199602 A1 | 8/2010 | Montano et al. | |

(Continued)

FOREIGN PATENT DOCUMENTS

| | | |
|---|---|---|
| EP | 0 915 015 A1 | 5/1999 |
| EP | 1 319 600 B1 | 6/2003 |

(Continued)

OTHER PUBLICATIONS

Spanish Search Report in related Spanish Application dated Nov. 26, 2019 (six pages).

(Continued)

*Primary Examiner* — Anna K Kinsaul
*Assistant Examiner* — Chinyere J Rushing-Tucker
(74) *Attorney, Agent, or Firm* — Kilpatrick Townsend & Stockton LLP

(57) ABSTRACT

A jaw assembly (10) that receives a tubular bag material (11) that is transversely sealed and transversely cut by the jaw assembly (10) to form bags 12 of snack food. The tubular bag material (11) is delivered in a downward direction (13). The jaw assembly (10) includes sealing jaws (27, 28), with the jaws (27, 28) operating in pairs to transversely seal the tubular bag material (11). Each of the jaws (27,28) has an end surface (29) that heats and engages the tubular bag material (11), to form the seal therein. Each surface (29) is spaced from its respective rotational axis by a radius (31). Most preferably the radius (31) is less than 85 mm, but greater than 65 mm.

20 Claims, 2 Drawing Sheets

(56) References Cited

U.S. PATENT DOCUMENTS

2013/0330027 A1   12/2013  Axe et al.
2016/0297554 A1*  10/2016  Hashimoto ............... B65B 9/20
2017/0247130 A1    8/2017  Hosaka et al.

FOREIGN PATENT DOCUMENTS

| EP | 1 325 868 A1 | 7/2003 |
| IT | 201600090075 A1 | 3/2018 |
| JP | H05-65110 A | 3/1993 |
| WO | 2011/135409 A1 | 11/2011 |
| WO | 2017/181711 A1 | 10/2017 |

OTHER PUBLICATIONS

British Search Report dated Jul. 10, 2019 in related British Patent Application GB 1903252.3 (two pages).

* cited by examiner

PACKAGING MACHINE

This application claims priority to Australian Application No. 2018900828, filed Mar. 13, 2018, the disclosure of which is incorporated by reference herein.

FIELD

The present invention relates to jaw assemblies for packaging machines that produce bags of product, such bags of snack foods.

BACKGROUND

Packaging machines receive bag material in tubular form. Product to be packaged is delivered to the interior of the tubular bag material, with the packaging machine then transversely sealing and cutting the tubular bag material to form bags of product. The tubular bag material is formed by a former shoulder to which the packaging film is delivered in strip form. Formers and packaging machines are described in U.S. Pat. Nos. 4,910,943, 5,622,032, 4,663,917, 6,655,110, 7,159,376, 7,600,630, 7,383,672, 4,753,336, 7,124,559, 7,415,809, 7,152,387 and 7,472,528, and Australian Patent Applications 2012258403, 20122584, 2012258497, 2012201494 and 2012201595, and 2011360138, and International Application PCT/EP2013/052754.

The tubular material provided by the former shoulder is longitudinally sealed. This function is performed by heating the tubular bag material along its longitudinally overlapping edges and by applying pressure to the overlapping longitudinal edges.

Located above the former is a weighing machine that delivers batches of product to a chute that extends toward the former shoulder.

The tubular bag material passes the former shoulder, is longitudinally sealed and then delivered to the packaging machine. While this is occurring batches of product are delivered to the interior of the tubular bag material by the weigher, the batches consisting of product scattered along a length of the tubular bag material. A film drive assembly is located below the former shoulder and above the packaging machine. The film drive assembly engages the tubular bag material to cause the strip material to pass over the former, and delivers the tubular bag material to the packaging machine below. Typically the film drive assembly includes a pair of driven belts that drive the tubular bag material at a desired velocity. Rollers can also be used. The packaging machine includes at least a pair of rotatably driven jaws, with the jaws having a peripheral speed (when engaged with the tubular bag material) that matches the velocity of the tubular bag material as determined by the film drive assembly.

Particularly in respect of snack foods there is a trend and pressure to provide the snack foods in bags of reduced size. The smaller bags are repackaged and are generally located in larger bags, although this is not always the case. That is, the smaller bags provide an individual serving for the consumer.

The abovementioned packaging machines have two jaws mounted on each shaft, with each rotation of the shafts through 360° producing two bags. The sealing surfaces of each jaw are spaced from the rotational axis of the shaft by a distance of about 100 mm.

With jaw assemblies as described above, that is with the sealing surfaces of the jaws being spaced from the rotational axis by about 100 mm, have the disadvantage that they are best suited, and are designed to produce bags of larger size, and therefore have the further disadvantage that they are not well adapted to produce the smaller bags at high production rates. In particular, where the jaws have a velocity profile that varies, the jaws need to be accelerated and deaccelerated prior to engaging the tubular bag material, and after engaging the tubular bag material, while when in sealing contact with the tubular bag material, the jaws need to be travelling at the same speed as the tubular bag material. This change in velocity, and therefore acceleration, presents a problem in respect of inertial forces.

OBJECT

It is the object of the present invention to overcome or substantially ameliorate at least one of the above disadvantages.

SUMMARY OF INVENTION

There is disclosed herein a packaging machine jaw assembly including:

a pair of drive shafts, the shafts being parallel and transversely spaced, with each shaft having a longitudinal axis, and being rotated repeatedly through 360° about its respective axis, with the shafts being rotated in opposite angular directions; and at least one sealing jaw attached to each shaft, so that the jaws are arranged in cooperating pairs, and wherein each sealing jaw has a sealing surface to engage downwardly moving tubular bag material to form a transverse seal therein, with each sealing surface being spaced from its respective rotational axis by a radius of less than 85 mm.

Preferably, each sealing surface is spaced from its rotational axis by a radius greater than 65 mm but less than 85 mm.

Preferably, each sealing surface is spaced from its respective axis by a radius less than 80 mm but greater than 70 mm.

Preferably, each sealing surface is spaced from its rotational axis by a distance of about 76 mm.

Preferably, the longitudinal axis is generally horizontal.

Preferably, the jaws when engaged with the tubular bag material are moving downward.

Preferably, the jaw assembly includes a stripper bar operatively associated with each jaw, so that co-operating pairs of the stripper bars strip the bag material prior to engagement of the sealing jaws with the tubular bag material.

Preferably, the assembly includes a closer bar operatively associated with each jaw, the closer bars co-operating in pairs to close the tubular bag material when the sealing jaws are in sealing contact with the tubular bag material.

Preferably, the stripper bars and closer bars moved downwardly when in contact with the tubular bag material.

BRIEF DESCRIPTION OF DRAWINGS

Preferred forms of the present invention will now be described by way of example with reference to the accompanying drawings wherein.

DESCRIPTION OF EMBODIMENTS

Figure 1:
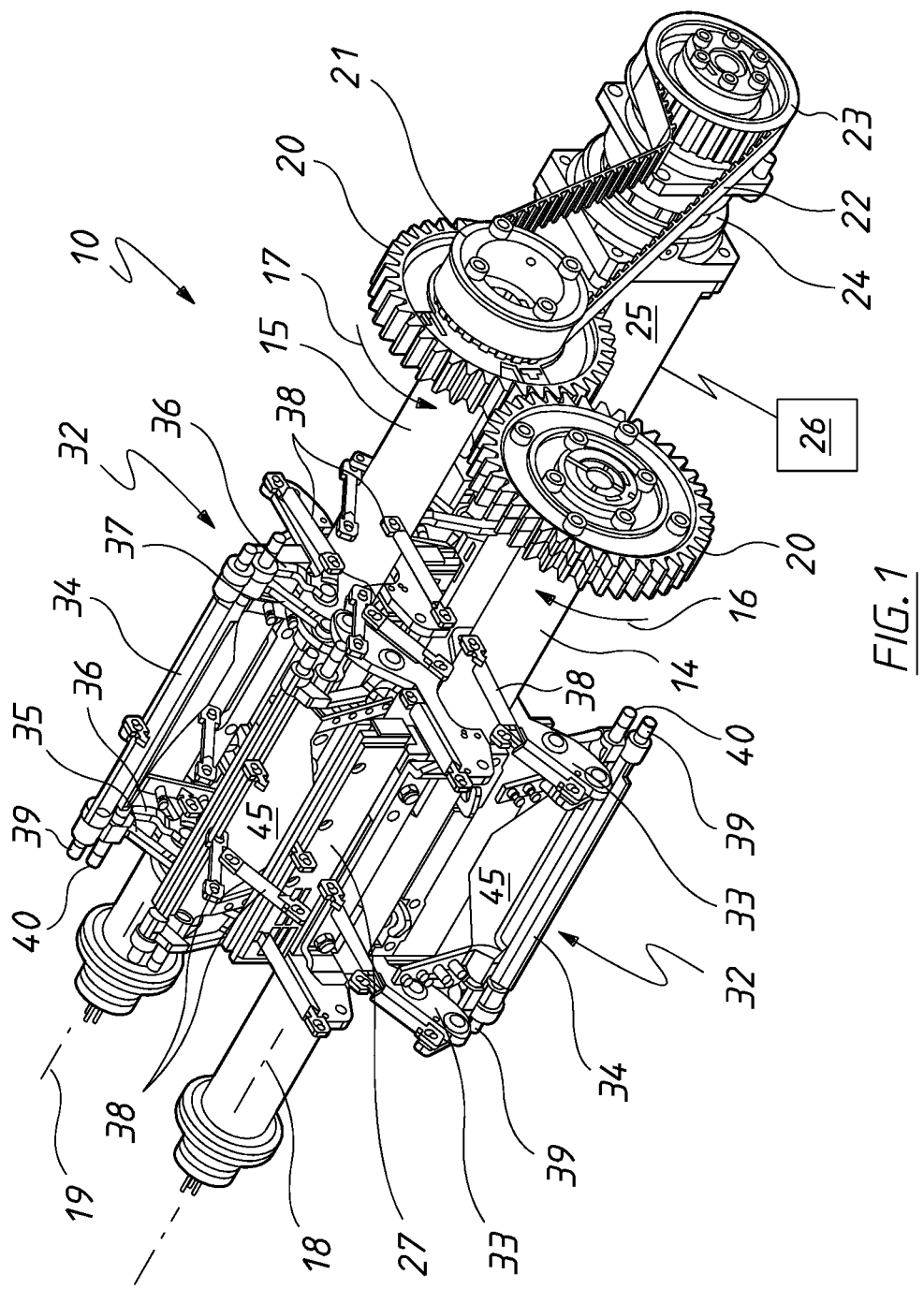
FIG. 1 is a schematic isometric view of the jaw assembly of a packaging machine.
Figure 2:
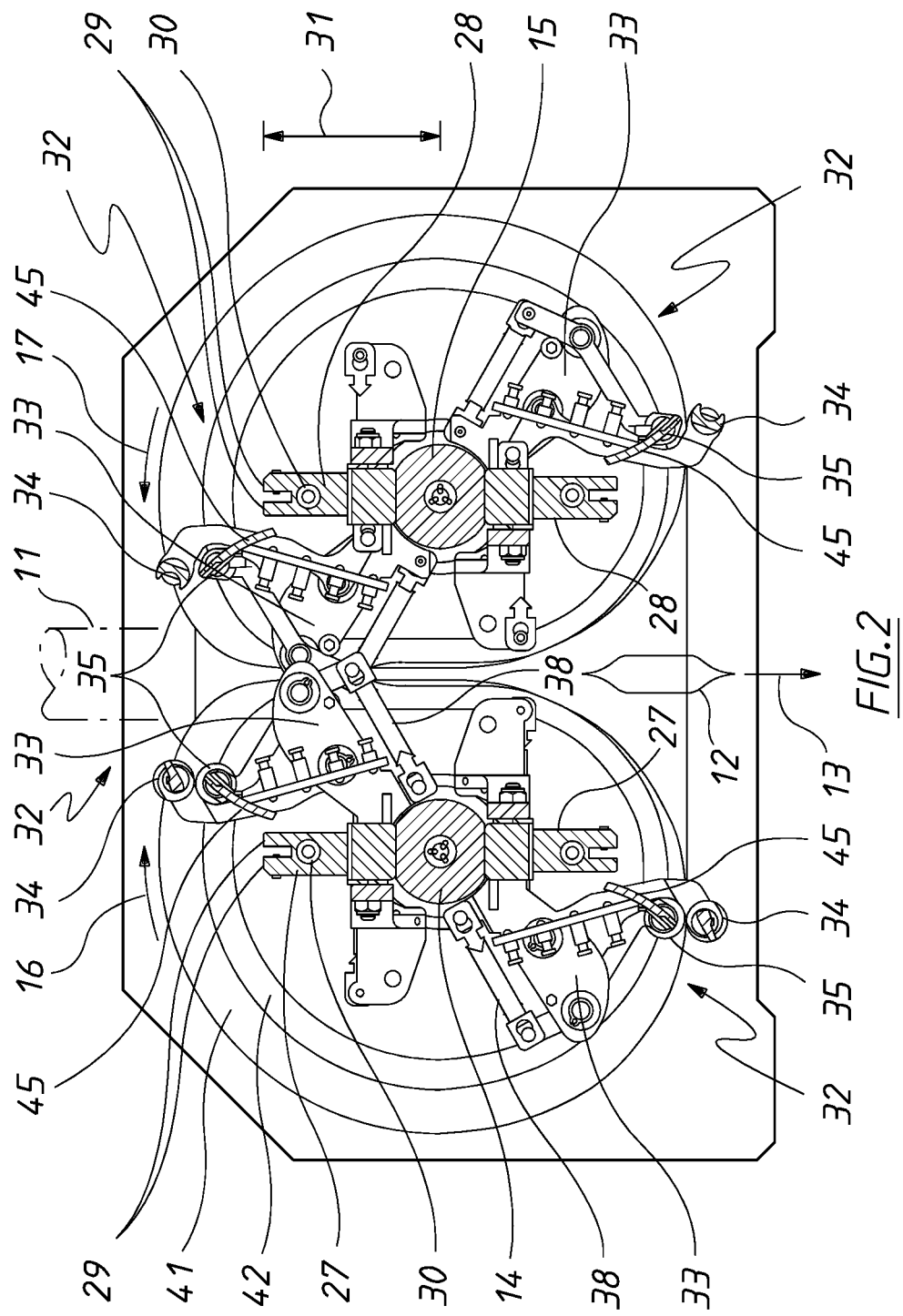
FIG. 2 is a schematic end elevation of the jaw assembly of FIG. 1.

In the accompanying drawings there is schematically depicted a jaw assembly 10 of a packaging machine.

The packaging machine would be located below a film drive assembly that delivers to the jaw assembly 10 tubular bag material 11 that is transversely sealed and transversely cut by the jaw assembly 10 to form bags 12 of snack food. The tubular bag material 11 is delivered in a downward direction 13.

The film drive assembly would include a sealing bar that forms a longitudinal seal in the tubular bag material 11 with the jaw assembly 10 forming the transverse seals for each bag 12.

Located above the film drive assembly is a former that receives the tubular bag material 11 in strip form, with the former receiving the strip bag material and forming the tubular bag material 11. Located above the former is a weighing machine that delivers batches of product to the interior of the tubular bag material 11 through a central opening in the former.

The jaw assembly 10 includes a pair of shafts 14 and 15 that are driven in opposite rotational directions 16 and 17. Each shaft 14 or 15 is driven rotationally through 360° repeatedly about its respective longitudinal rotational axis 18 or 19. The axes 18 and 19 are generally horizontal.

The shafts 14 and 15 are generally parallel and transversely spaced and are substantially co-extensive.

Fixed to each shaft 14/15 is a drive gear 20, with the gears 20 driving the shafts 15 and 16 in opposite rotational directions 16/17.

Fixed to one of the gears 20 is a pulley 21 that is engaged by a drive belt 22 that extends about a drive pulley 23.

The pulley 23 is driven by a gear box 24 that is in turn driven by a servo motor 25.

The servo motor 25 is governed in respect of its operation by a controller (computer) 26. The controller 26 governs operation of the above described film drive assembly and weighing machine.

Attached to each shaft 14/15 is a pair of sealing jaws 27 or 28. Each jaw 27 is operatively associated with a respective one of the jaws 28 to engage the tubular bag material 11, to form the transverse seal therein. When engaged with the tubular bag material 11, the jaws 27 and 28 are moving downward in the direction 13 at the same velocity as the tubular bag material 11.

When engaged with the tubular bag material 11, the jaws 27/28 are travelling at the same speed of the tubular bag material 11. However, when not engaged with the tubular bag material 11, the shafts 14 and 15 are driven at angular velocities that change so that the jaws 27/28 are moved inbetween engagement with the tubular bag material 11 as quickly as possible, thereby enabling a greater production rate of the bags 12.

In this embodiment each shaft 14/15 has a pair of jaws 27/28. However, in alternate embodiments there is at least one jaw 27/28 attached to each respective shaft 14/15.

Each jaw 27/28 has an end surfaces 29 that are heated and engages the tubular bag material 11 to form a transverse seals therein. Not illustrated, is a blade mounted in each jaw 27/28 that severs the tubular bag material 11 adjacent the transverse seals so as to form the bag 12. In that regard, the surfaces 29 are each arranged into subsurfaces, the subsurfaces forming a part of the transverse seal on opposite sides of the blade, so that the when the bag 12 is severed, the bag 12 formed has an end seal, while the next bag has a bottom end seal.

Mounted within each jaw 27/28 is a heating element 30 that heats the jaws 27/28 so that the surfaces 29 form the transverse seals.

Each surface 29 is spaced from its respective axis 18/19 by a radius 31. That is, each surface 29 is spaced from its respective axis by a predetermined distance.

Preferably the radius is less than 85 mm but greater than 65 mm.

In an alternative preferred form the radius 31 is less than 80 mm but greater than 70 mm.

Most preferably the radius 31 is about 76 mm.

Having the radius 31 as described above, the inertial forces generated by the jaws 27/28, is greatly reduced. This enables the jaws 27/28 to be accelerated more rapidly and then deaccelerated, in order to speed up the production rate of the bags 12.

Operatively associated with each sealing jaws 27/28 is a stripping and closing assembly 32.

Each assembly 32 includes a pair of mounting arms 33 that in turn support a pair of closer bars 34 and a pair of stripper bars 35.

The closer bars 34 are arranged in opposing pairs 34 while the strip bars 35 are arranged in co-operating pairs 35.

As each sealing jaw 27/28 approaches the tubular bag material 11, the bars 34 and 35 engage the tubular bag material to strip the tubular bag material and to close the tubular bag material to ensure that product is not located in this seal being formed by the jaws 27/28.

In particular, the stripper bars 35 travel down the tubular bag material 11 to move the tubular bag material towards the bottom end of the bag 12 being formed and therefore remove product that may be located in the seal. The closer bars 34 engage the tubular bag material 11 above the stripper bars 35, and close the tubular bag material 11 to ensure that the next batch being delivered does not result in product entering the area being sealed.

Preferably each of the stripper bars 35 has a shield 45 that is placed adjacent the tubular bag material 11 to aid in isolating the surfaces 29 from unintentional contact with the tubular bag material 11.

Each of the bars 34/35 is mounted on the end of an arm 36/37, with each arm 36/37 being pivotally mounted on the arms 33 for angular movement about axes generally parallel to the rotational axes 18/19. The arms 36 that support the stripper bars 35 are urged by means of springs 38 to a predetermined position relative to the shafts 14 and 15.

Additionally, each of the bars 34/35 has an end projection 39/40 operatively associated with a cam track 41/42 to position the bars 34/35 for correct engagement with the tubular bag material 11.

During operation of the above described bars 34/35, the stripper bars 35 engage the tubular bag material 11 and have a greater downward velocity that the tubular bag material 11, thereby moving down the tubular bag material 11 to "strip" the tubular bag material 11. A "stripping" function merely entails ensuring that product delivered to the interior of the tubular bag material 11 is moved downward so as to be clear of the transverse seal being formed.

The closer bars 34 engage the tubular bag material 11 and close the tubular bag material 11 to ensure that the next following batch of product does not end up in the seal area being formed. When engaged with the tubular bag material, the bars 34 are moving downward.

The invention claimed is:

1. A packaging machine jaw assembly including:
   a pair of drive shafts, the shafts being parallel and transversely spaced, with each shaft having a longitudinal axis, and being rotated repeatedly through 360° about its respective axis, with the shafts being rotated in opposite angular directions; and at least one sealing jaw attached to each shaft, so that the jaws are arranged in cooperating pairs, and wherein each sealing jaw has a sealing surface to engage downwardly moving tubular bag material to form a transverse seal therein, with each sealing surface being spaced from its respective rotational axis by a radius of less than 85 mm.

2. The jaw assembly of claim 1, wherein each sealing surface is spaced from its rotational axis by a radius greater than 65 mm but less than 85 mm.

3. The jaw assembly of claim 2, wherein each sealing surface is spaced from its respective axis by a radius less than 80 mm but greater than 70 mm.

4. The jaw assembly of claim 3, wherein each sealing surface is spaced from its rotational axis by a distance of about 76 mm.

5. The jaw assembly of claim 3, wherein the longitudinal axis is generally horizontal.

6. The jaw assembly of claim 3, wherein the jaws when engaged with the tubular bag material are moving downward.

7. The jaw assembly of claim 3, wherein the jaw assembly includes a stripper bar operatively associated with each jaw, so that co-operating pairs of the stripper bars strip the bag material prior to engagement of the sealing jaws with the tubular bag material.

8. The jaw assembly of claim 7, wherein the assembly includes a closer bar operatively associated with each jaw, the closer bars co-operating in pairs to close the tubular bag material when the sealing jaws are in sealing contact with the tubular bag material.

9. The jaw assembly of claim 8, wherein the stripper bars and closer bars moved downwardly when in contact with the tubular bag material.

10. The jaw assembly of claim 1, wherein the longitudinal axis is generally horizontal.

11. The jaw assembly of claim 10, wherein the jaws when engaged with the tubular bag material are moving downward.

12. The jaw assembly of claim 10, wherein the jaw assembly includes a stripper bar operatively associated with each jaw, so that co-operating pairs of the stripper bars strip the bag material prior to engagement of the sealing jaws with the tubular bag material.

13. The jaw assembly of claim 12, wherein the assembly includes a closer bar operatively associated with each jaw, the closer bars co-operating in pairs to close the tubular bag material when the sealing jaws are in sealing contact with the tubular bag material.

14. The jaw assembly of claim 13, wherein the stripper bars and closer bars moved downwardly when in contact with the tubular bag material.

15. The jaw assembly of claim 14, wherein each sealing surface is spaced from its rotational axis by a distance of about 76 mm.

16. The jaw assembly of claim 15, wherein the longitudinal axis is generally horizontal, the jaws when engaged with the tubular bag material are moving downward, the jaw assembly includes a stripper bar operatively associated with each jaw, so that co-operating pairs of the stripper bars strip the bag material prior to engagement of the sealing jaws with the tubular bag material, and a closer bar operatively associated with each jaw, the closer bars co-operating in pairs to close the tubular bag material when the sealing jaws are in sealing contact with the tubular bag material, with the stripper bars and closer bars moved downwardly when in contact with the tubular bag material.

17. The jaw assembly of claim 1, wherein the jaws when engaged with the tubular bag material are moving downward.

18. The jaw assembly of claim 1, wherein the jaw assembly includes a stripper bar operatively associated with each jaw, so that co-operating pairs of the stripper bars strip the bag material prior to engagement of the sealing jaws with the tubular bag material.

19. The jaw assembly of claim 18, wherein the assembly includes a closer bar operatively associated with each jaw, the closer bars co-operating in pairs to close the tubular bag material when the sealing jaws are in sealing contact with the tubular bag material.

20. The jaw assembly of claim 19, wherein the stripper bars and closer bars moved downwardly when in contact with the tubular bag material.

* * * * *